March 1, 1955  A. A. MANSBACH  2,703,230
APPARATUS FOR RECLAIMING BABBITT FROM METAL SCRAP
Filed Nov. 6, 1950  5 Sheets-Sheet 5

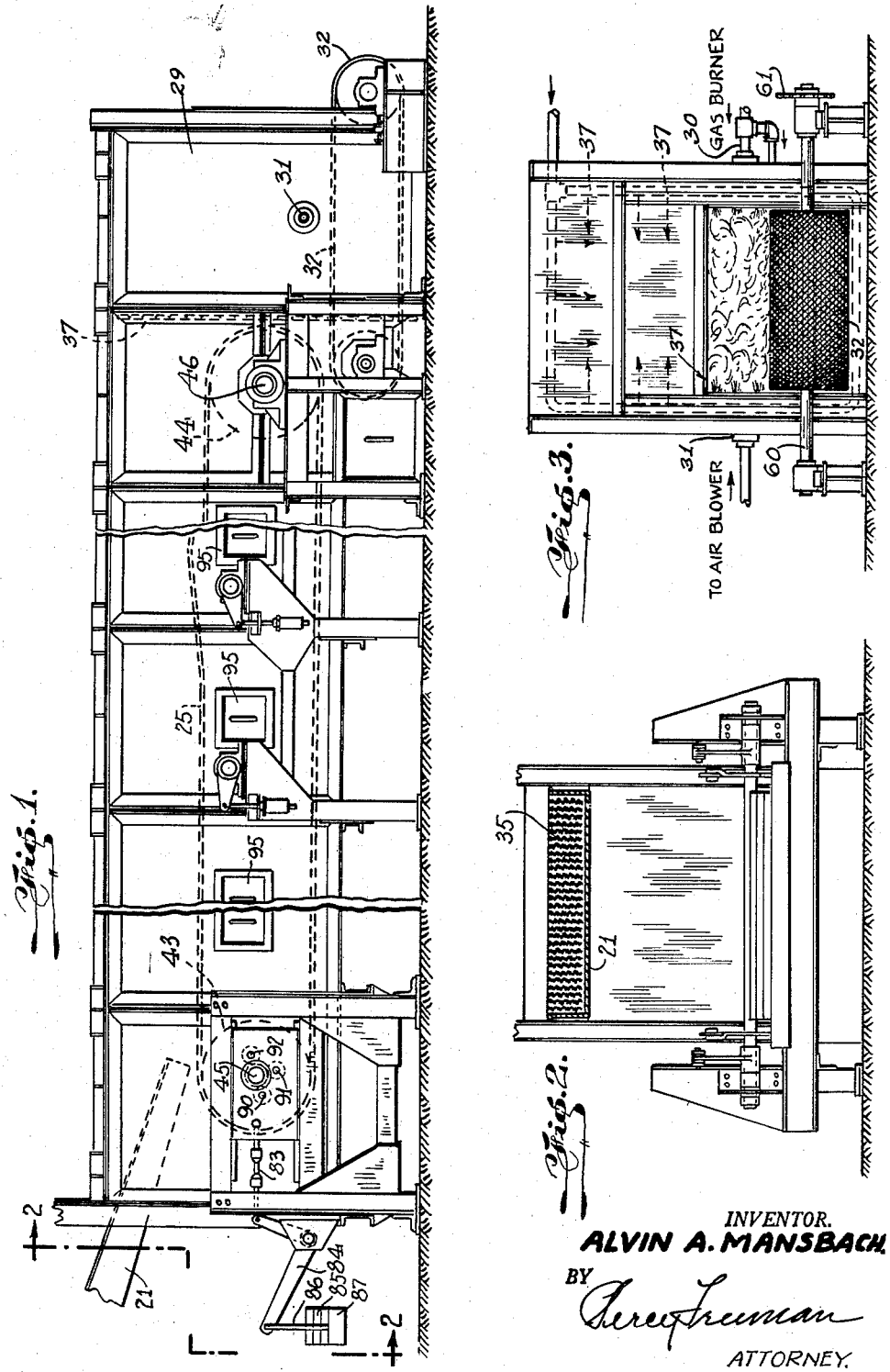

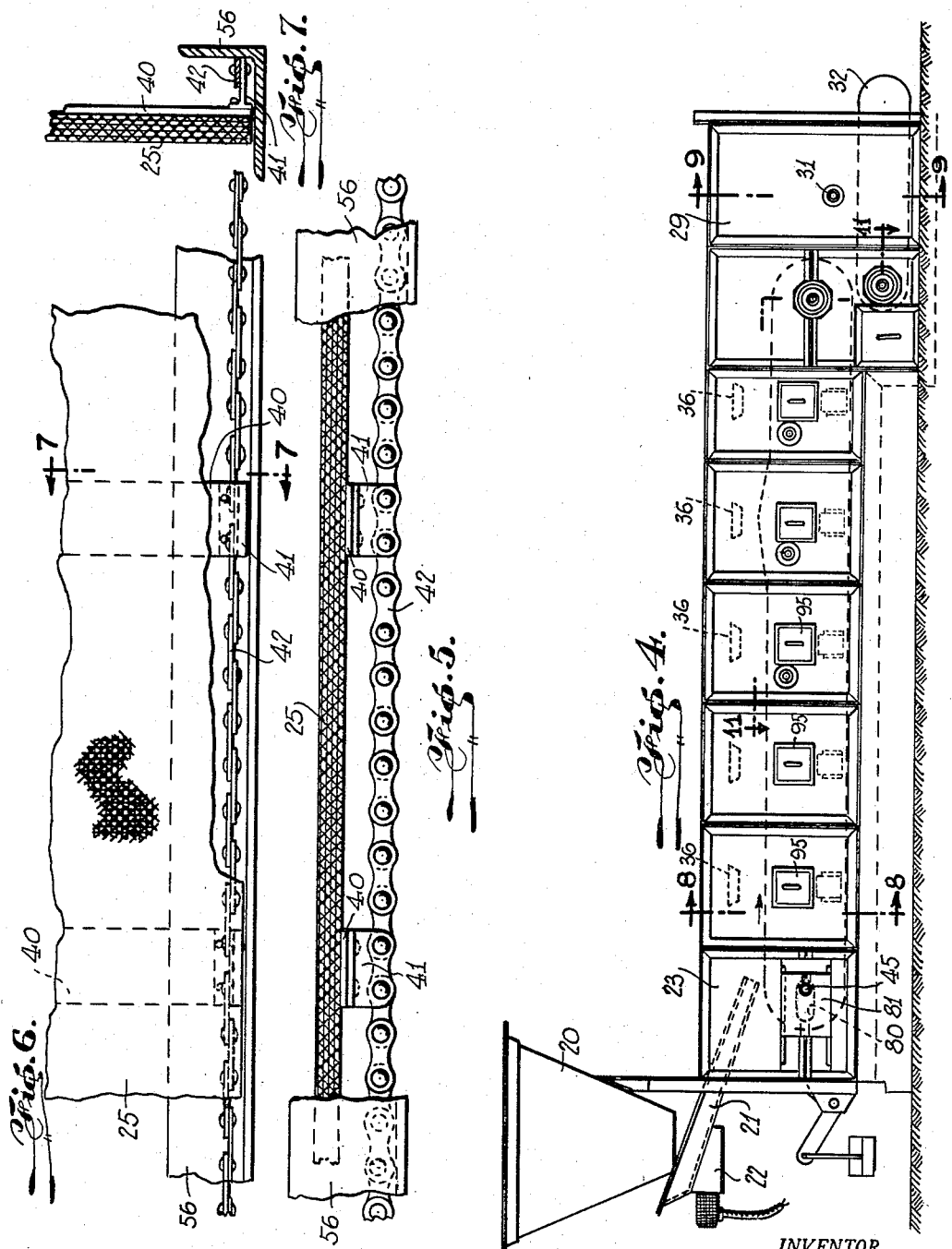

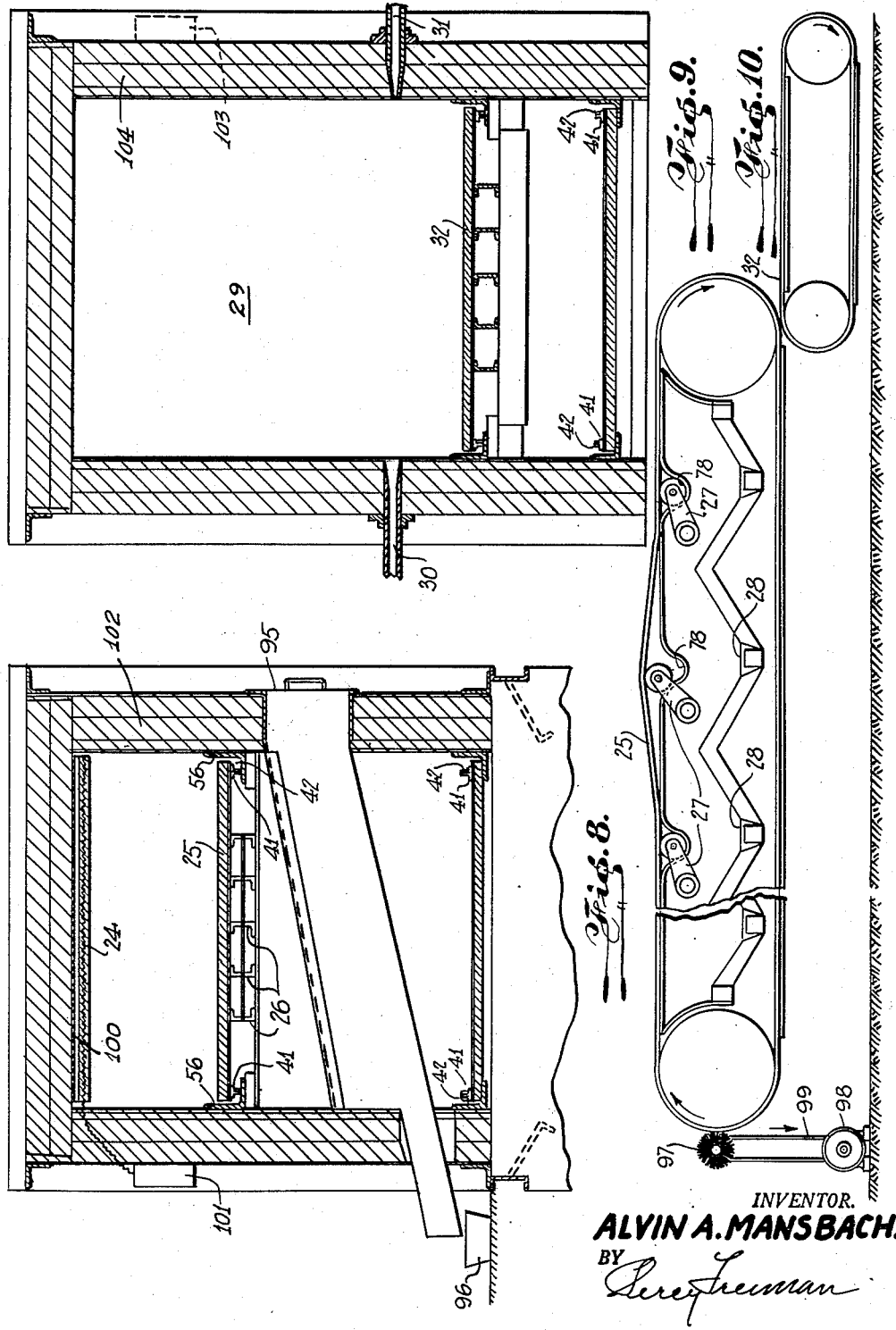

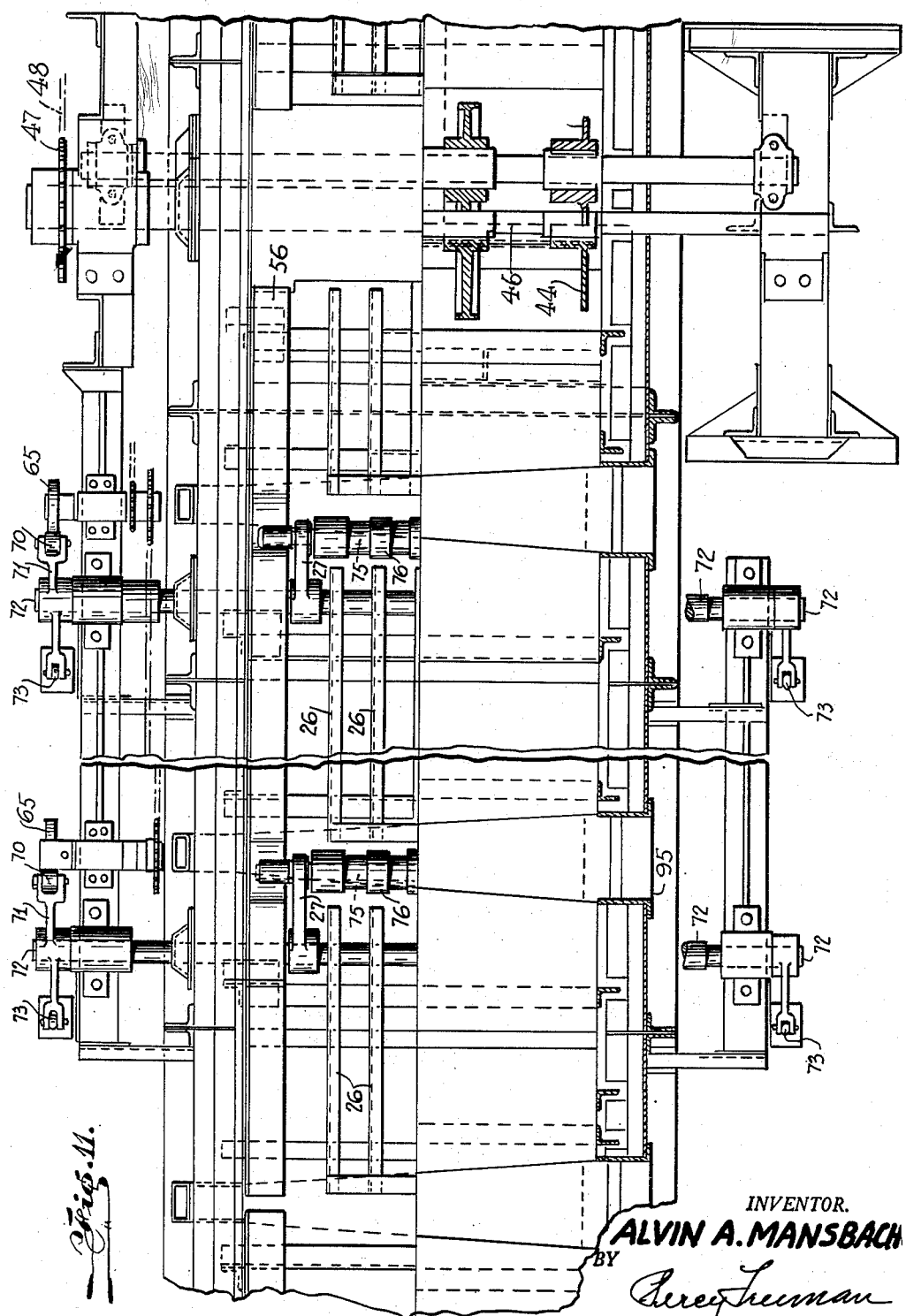

INVENTOR.
ALVIN A. MANSBACH.
BY
ATTORNEY.

United States Patent Office 2,703,230
Patented Mar. 1, 1955

2,703,230

APPARATUS FOR RECLAIMING BABBITT FROM METAL SCRAP

Alvin A. Mansbach, New York, N. Y., assignor to Metal Separation Corporation, New York, N. Y., a corporation of New York Application November 6, 1950, Serial No. 194,263

4 Claims. (Cl. 266—37)

This invention relates to an apparatus for reclaiming babbitt from bearing shells, turnings, punchings and the like. It contemplates the reclamation of either tin-base or lead-base babbitt, and it also contemplates the reclamation of substantially babbitt-free steel from babbitt-bearing steel scrap, such as the shells, turnings and punchings above mentioned.

The invention constitutes an improvement over the invention disclosed in Patent No. 2,154,673, issued on April 18, 1939, to Leroy S. Fleck and Alvin A. Mansbach, applicant herein.

The principal object of this invention is the provision of means of almost fully reclaiming babbitt from babbitt-bearing steel scrap and of oxidizing the remaining small amount of babbitt so the residual steel is almost babbitt-free.

The apparatus is divided into two sections. The first section includes means for melting most of the babbitt off the steel scrap; the second section includes an oxidizing chamber for oxidizing the babbitt that remains on the steel scrap.

An important feature of this invention is the absence of an oxidizing atmosphere in the babbitt-melting chamber of the first section of the apparatus. The melting process is carried out in an atmosphere which may be described as inert or non-oxidizing. Consequently, there is no loss of babbitt resulting from oxidation, and there is no loss of reclaimable steel scrap. Commercial processes which are now employed by the industry utilize babbitt-melting chambers which are at the same time babbitt oxidizing chambers. The melting and oxidizing phases proceed simultaneously or concurrently and considerable quantities of oxidized babbitt escape with the flue gases. The apparatus herein described and claimed not only fully and completely reclaim the babbitt from babbitt-bearing steel scrap but they also fully and completely reclaim the steel from said steel scrap for further processing in accordance with conventional steel reclamation methods.

Other important features of the present invention may be described as follows:

1. A mesh-type of conveyer belt which carries the babbitt-bearing steel scrap through the melting chamber. A steel mesh belt is employed and in one embodiment of this invention the belt is approximately five feet wide. The mesh is sufficiently fine to prevent the steel scrap from falling through but it is sufficiently coarse to allow the melted babbitt to pass through. This type of conveyer belt renders it possible to expose large quantities of babbitt-bearing steel scrap to the heat of the melting chamber. The steel scrap may be spread out relatively thin on the wide belt to expose all of the surfaces of all of the pieces of scrap to the heat.

In some apparatus for reclaiming babbitt from steel scrap, the steel scrap is loaded manually into a slowly revolving cylinder which is open at both ends and heat is supplied at both ends by forced gas burners and the charge is heated for an hour or more until the babbitt melts off. In order to reclaim the babbitt it was necessary to heat the entire mass to a temperature of about 1500° F. At this temperature, the babbitt oxidized and some of it was lost in the flue gases. Under this process, the steel became contaminated on all surfaces with oxidized babbitt. The oxidized babbitt totaled 3% or more, and it will be understood that this oxidized babbitt cannot be reclaimed. The steel which the oxidized babbitt contaminates is of extremely poor quality. It is difficult to use and to sell and it commands very low prices.

In the apparatus herein claimed, the mesh-type of continuous conveyer belt renders it possible to melt most of the babbitt off the steel scrap in eight to ten minutes, at operating temperatures of between 850° and 950° F. With this operating temperature, approximately 99.4% of the available babbitt is reclaimed.

2. A vibratory chute which feeds the babbitt-bearing steel scrap from a hopper to the conveyer belt. This chute spreads the steel scrap in a uniformly thin layer upon the conveyer belt so as to expose all of the surfaces of the steel scrap to the heat of the melting chamber and also for the purpose of rendering it easier for the melted babbitt to flow away from the steel scrap and through the apertures of the conveyer belt. Under this arrangement, other surfaces are not contaminated.

3. Conveyer belt shaking or agitating means to shake the melted babbitt loose from the steel scrap. The preferred embodiment of this invention makes use of cam-actuated arms to raise and then to drop spaced portions of the conveyer belt. This action has the effect of jarring the babbitt loose from the steel.

4. A brush which cleans the conveyer belt and keeps its apertures clear for free and unhindered flow of the melted babbitt. The brush which is incorporated into the apparatus of the present invention is a rotary wire brush which rotates in engagement with the conveyer belt in the opposite direction from the direction of travel of said belt.

These features are productive of substantial advantages over conventional babbitt reclaiming apparatus and methods. It has been stated that approximately 99.4% of all available babbitt is reclaimed in the present apparatus, referring to the melting chamber of the apparatus herein claimed. This represents a loss of approximately 0.6% of babbitt as against a loss of 3% or more when other known apparatus is used. Furthermore, the unreclaimed babbitt which remains on the steel scrap is in the form of oxidized babbitt. There is a further saving in labor. When conventional apparatus is used, it takes five men to handle approximately 2000 pounds of scrap per hour. When the apparatus of the present invention is used, one man can handle 3600 pounds of scrap per hour.

A preferred form of the apparatus herein described and claimed is shown in the accompanying drawing, in which:

Fig. 1 is a side view of said apparatus.

Fig. 2 is an end view thereof, partly in section, looking in the direction of arrows 2—2 of Fig. 1.

Fig. 3 is an end view of the opposite end of said apparatus.

Fig. 4 is a view somewhat similar to that of Fig. 1, but also showing the hopper and vibratory chute which feed the steel scrap to the conveyer belt.

Fig. 5 is an enlarged fragmentary view of the conveyer belt which carries the steel scrap through the melting chamber.

Fig. 6 is a fragmentary top view thereof.

Fig. 7 is a sectional view therethrough on the line 7—7 of Fig. 6.

Fig. 8 is a vertical section on the line 8—8 of Fig. 4.

Fig. 9 is a vertical section on the line 9—9 of Fig. 4.

Fig. 10 is a diagrammatic view of the entire conveyer belt system of the apparatus, showing the conveyer belt shaking means and the conveyer belt cleaning means above mentioned.

Fig. 11 is a horizontal section on the line 11—11 of Fig. 4, this view being fragmentary and sufficiently enlarged to show the details of construction of the apparatus.

Figure 12:
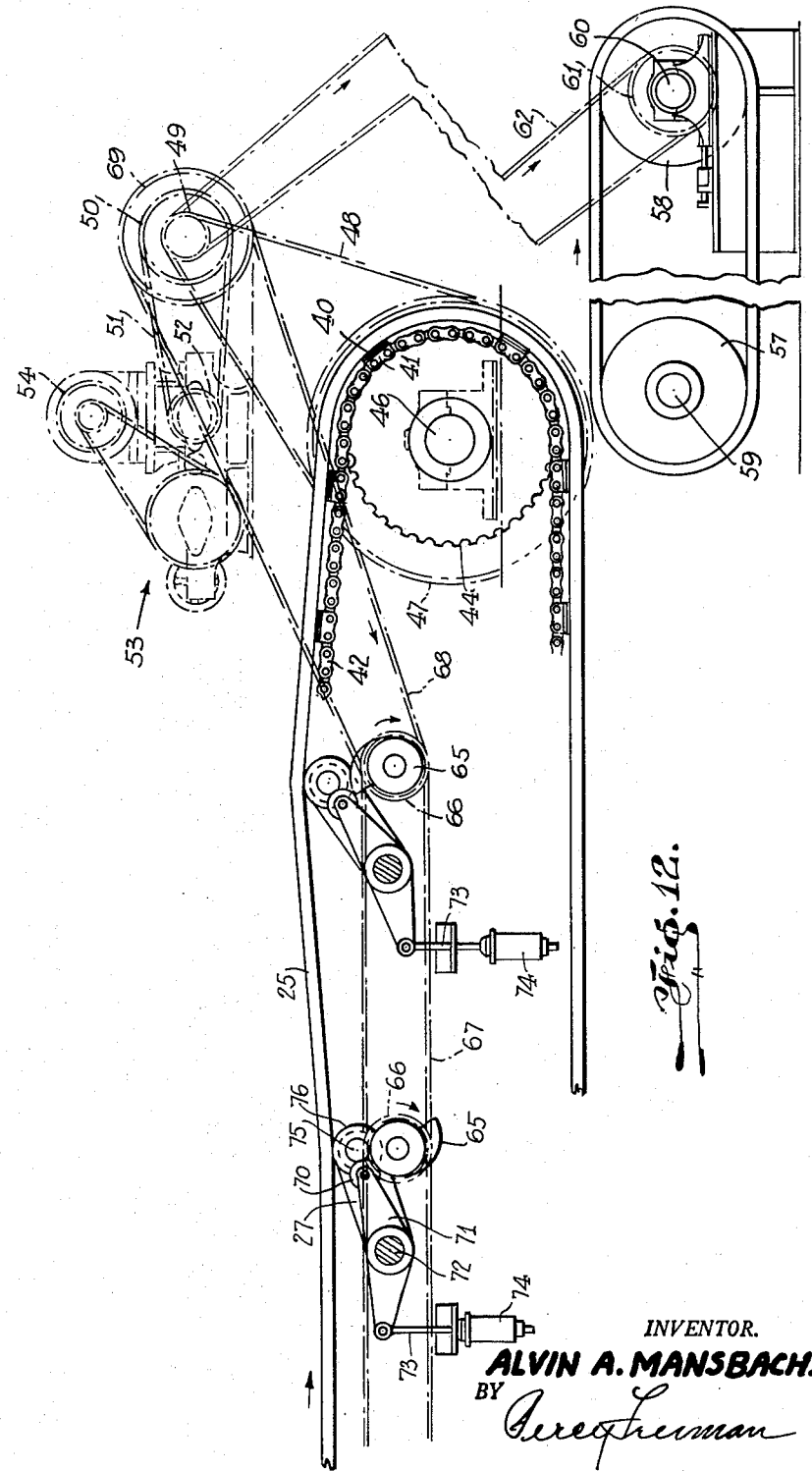
Fig. 12 is a fragmentary, diagrammatic, side view of the apparatus showing the drive mechanism which drives the entire conveyer belt system and also the conveyer belt shaking mechanism.

The reclaiming apparatus constituting the present invention includes the following elements: a hopper 20 into which the babbitt-bearing steel scrap is deposited, a chute 21 which feeds the steel scrap from the hopper, a vibrating element 22 which causes the chute to vibrate and thereby to facilitate uniform feeding of the steel scrap, a melting chamber 23 into which the steel scrap is fed and in which the babbitt is melted off the steel, a heating element 24 which produces sufficient heat in said melting chamber to melt the babbitt, a mesh-type of conveyer belt 25 which receives the scrap from the chute and carries it through the melting chamber during the course of the babbitt-melting phase, a plurality of belt-supporting bars 26, a plurality of cam-actuated arms 27 which intermittently raise the conveyer belt a spaced distance above said supporting bars and then allow the conveyer belt to drop down upon said supporting bars and thereby to shake melted babbitt loose from the steel scrap, a plurality of sloping troughs or chutes 28 which are disposed underneath the upper run of the conveyer belt and which receive the melted babbitt through the apertures of the conveyer belt, an oxidizing chamber 29 in which such babbitt as remains on the steel scrap at the conclusion of the babbitt-melting phase is oxidized to purify the steel for steel reclaiming purposes, an air intake 30 and a gas burner 31 which provide the oxidizing chamber with an oxidizing atmosphere maintained at an elevated temperature, and a mesh-type of conveyer belt 32 which receives the steel scrap from the first conveyer belt 25 and carries it through the oxidizing chamber.

It will be understood that the atmosphere of the melting chamber 23 is non-oxidizing or inert with respect to the babbitt. To produce and maintain such non-oxidizing atmosphere, it is necessary to seal off the ends of the chamber and either to render the atmosphere therein inert by means of charcoal or the like or to introduce therein an inert gas. One way of accomplishing this result is to place a curtain 35 at the inlet end of the melting chamber and a flame seal at the outlet end of said melting chamber and several containers 36 of charcoal within said melting chamber. The curtain will tend to prevent the outside air from entering the melting chamber and the flame seal will prevent the oxidizing gases of the oxidizing chamber from entering said melting chamber. This flame seal may be produced by simply placing a plurality of gas jets 37 between the melting and oxidizing chambers and maintaining a gas flame which completely envelops the plane of juncture between the two chambers. This flame has the effect of preventing any oxidizing gases from passing into the melting chamber from the oxidizing chamber.

Conveyer belt 25 is a wire mesh belt of great flexibility. It is mounted on cross bars 40 and said cross bars are fastened by means of brackets 41 to spaced links of endless chain 42. Said endless chain is mounted on sprockets 43 and 44, respectively, which, of course, are mounted on suitable shafts 45 and 46, respectively. Another sprocket 47 is mounted on shaft 46 and a drive chain 48 connects said sprocket 47 to another sprocket 49. Sprockets 47 and 49 and chain 48 on said sprockets are merely illustrative of a drive mechanism and a belt and pulley drive may be used in their place. Sprocket 49 is mounted on a shaft which is connected to another sprocket or pulley 50. Sprocket or pulley 50 is connected by means of a chain or belt to a sprocket or pulley 52 of a variable speed transmission 53 driven by a motor 54. It is by this means that chain 42 on which conveyer belt 25 is mounted, is driven, thereby driving or running the conveyer belt. It will be seen that chain 42 rides on the horizontal stretches of a pair of L-shaped channels 56. The vertically extending portions of said channels serve as side walls to prevent lateral displacement of the conveyer belt and to prevent the steel scrap from falling off the sides of the conveyer belt.

A similar drive mechanism drives conveyer belt 32 which, like conveyer belt 25, is mounted on an endless chain. Said endless chain is mounted on sprockets 57 and 58 and said sprockets are mounted on shafts 59 and 60. Connected to shaft 60 is another sprocket 61 and a chain 62 connects said sprocket 61 to sprocket 49 above mentioned. A belt and pulley drive may be substituted if desired, for sprockets 61 and 49 and chain 62.

The cam-actuated arms 27 which intermittently raise and then drop conveyer belt 25 are best shown in Figs. 10, 11 and 12. It will there be noted that a plurality of cams 65 are rotatably mounted below the upper stretch of conveyer belt 25. A suitable drive mechanism including pulleys or sprockets 66, belts or chains 67 and 68, and pulley or sprocket 69 connects said rotatably mounted cams to the variable speed transmission 53 above mentioned. Cam followers 70, mounted on rockers 71, engage cams 65. These rockers are pivotally mounted on shafts 72 and their opposite ends are connected by means of links 73 to dash-pots 74. Also connected to shafts 72 are the belt-raising arms 27 above referred to. At the free ends of arms 27 are shafts 75 carrying rollers 76. It is these rollers which engage the underside of the upper stretch of conveyer belt 25 to lift said conveyer belt at spaced intervals during the operation of the apparatus described. It will be understood that when the drive mechanism connected to the rotatably mounted cams causes said cams to rotate, rockers 71 will thereby be caused to rock and arms 27 will intermittently swing upwardly and drop downwardly to raise and then drop the upper stretch of the conveyer belt. Dash-pots 74 serve to cushion the action but they do not lessen the jarring effect upon the melted babbitt when the conveyer belt falls upon its supporting bars 26. It will be seen in Fig. 10 that recesses 78 are provided to receive rollers 76 when lifting arms 27 drop to their lowermost positions.

This intermittent raising and lowering of portions of conveyer belt 25 requires a yieldable support for at least one of the shafts which supports it. This is shown in Figs. 1 and 4 where it will be noted that shaft 45 is mounted in longitudinally extending slots 80 of plates 81, which serve as bearings or supports for said shaft. Plates 81 are slidably supported in frame 82 and adjustable links 83 connect said plates 81 to bell cranks 84. The bell cranks support removable weights 85 by means of hangers 86 and a cross bar 87 carried by said hangers. It is thus possible for shaft 45 to move either forwardly or backwardly in slot 80, the movement in one direction being in response to the action of the weighted bell cranks thereon and movement in the opposite direction being in opposition to the action of said weighted bell cranks. It will, therefore, be understood that the lifting action of the lifting arms 27 takes place against the pulling action of the weighted bell cranks and that the weighted bell cranks will act to pull the conveyer belt taut and to drop the lifted portions thereof when said conveyer belt is disengaged by the lifting arms. This action is facilitated by the presence of rollers 90, 91 and 92 on which shaft 45 rests.

Sloping troughs or chutes 28 are best shown in Figs. 8 and 10. It will be noted that clean-out doors 95 are provided at the upper ends of said troughs or chutes and that the lower ends are open to allow the melted babbitt to flow into ingot molds 96. The clean-out doors 95 are extremely important because it is necessary to clean out the troughs or chutes of lead base babbitt when it is desired to run tin base babbitt and conversely to clean out tin base babbitt when it is desired to run lead base babbitt. In this connection, it will be understood that steel scrap containing lead base babbitt and steel scrap containing tin base babbitt are never run together through the reclaiming apparatus since it is most undesirable to mix the two kinds of babbitt.

In view of the fact that conveyer belts of meshed wires are employed in this apparatus, it is desirable to provide rotary wire brushes 97 driven by motor or motors 98 and drive belt or belts 99 to clean the conveyer belt after it deposits its load of scrap. Some of the scrap might tend to become entangled in the meshed wire and a rotary wire brush rubbing against the meshed wire removes the entangled scrap very nicely. Although only brush element is shown in the drawing and that brush element relates only to conveyer belt 25, it will be understood that at least one other suitably driven brush element may be provided for cleaning engagement with conveyer belt 32.

The process herein may be carried out on the apparatus above described in the following manner: Babbitt-bearing steel scrap is placed in the hopper and fed to the first conveyer belt 25 through the instrumentality of the vibratory chute. The curtain across the chute is flexible and it yields sufficiently to allow the steel scrap to pass through. The conveyer belt carries the steel scrap through the melting chamber where it is heated by heating element 24. This is an electric heating element which is heated to a temperature of approximately 2300° F. but the operating temperature at the conveyer belt should range between 850° and 950° F. The heat which the steel scrap receives from said heating element is radiant heat and a reflector 100 may be provided above the heating element to reflect the radiant heat downwardly upon the steel scrap. A temperature control box 101 may be provided to automatically control the temperature in the melting chamber and insulating material 102 may be provided in all of the walls of the melting chamber to help conserve the heat therein. Most of the babbitt is melted off the steel scrap as it is carried through the melting chamber. The presence of the charcoal tends to prevent oxidizing of the babbitt. The melted babbitt flows through the apertures in the conveyer belt and chutes 28 then direct the flow into the ingot molds. Conveyer belt 25 then deposits the steel scrap upon the second conveyer belt 32, thereby carrying said scrap through the flame seal which separates the melting and oxidizing chambers. The combustion gases in the oxidizing chamber provide a temperature of approximately 1700° to 1900° F. in the vicinity of the second conveyer belt. A temperature control box 103 automatically maintains a uniform temperature and insulating material 104 in the walls of the oxidizing chamber tends to conserve the heat. Nearly all of what remains of the babbitt on the steel scrap is oxidized in the oxidizing chamber and the steel scrap which remains is carried out of the oxidizing chamber by the second conveyer belt. The steel leaves the oxidizing chamber in reclaimable condition.

The apparatus above described is illustrative of the broad principles of the invention and may be modified in many respects within the broad scope and spirit of the invention.

Having thus described my invention, what I claim as new and desire to secure by Letters Patent, is:

1. Apparatus for re-claiming babbitt from babbitt-bearing steel scrap, comprising a melting chamber, an oxidizing chamber to receive partially treated scrap from the melting chamber, means for maintaining in said melting chamber an atmosphere which is non-oxidizing with respect to babbitt, means for maintaining in said oxidizing chamber an atmosphere which is oxidizing with respect to babbitt, means for heating the melting chamber by means of radiant reflected heat to a temperature of approximately between 850° and 950° F., means for heating the oxidizing chamber by combustion gases which are oxidizing with respect to babbitt, means for maintaining in said oxidizing chamber a temperature of between 1700° and 1900° F., a first conveyer belt in the melting chamber and a second conveyer belt in the oxidizing chamber, the first conveyer belt being constructed and arranged to carry the babbitt-bearing steel scrap through the melting chamber and to deposit the steel scrap and such babbitt as remains thereon after it has passed through the melting chamber upon the second conveyer belt, said second conveyer belt being constructed and arranged with one end of the upper rim disposed directly beneath the lower rim of said first conveyer belt to receive and to carry said steel scrap through the oxidizing chamber and then to deposit the same outside of said oxidizing chamber, said first conveyer belt being made of meshed wire having apertures sufficiently large to allow the melted babbitt to pass therethrough but too small to allow the steel scrap to fall therethrough, sloping troughs underneath the upper stretch of the first conveyer belt to catch the melted babbitt which passes through the apertures in said belt and to direct it to suitable moulds, a plurality of cam actuated belt-raising arms pivotally mounted below the upper stretch of said first conveyor belt, to intermittently and alternately raise and drop said first conveyer belt, each said belt-raising arm being connected to a rocker, one end of each said rocker rotatably mounting a cam follower, a cam operatively associated with each said cam follower to oscillate the rocker and power transmission means operatively connecting said cams to a source of power.

2. Apparatus in accordance with claim 1 including a dash-pot for each rocker and a link to connect the end of the rocker opposite the cam follower to the dash-pot, the free ends of the belt-raising arms carrying a shaft which carries rollers which engage the underside of the upper stretch of the conveyor belt to lift it at spaced intervals during operation of the apparatus.

3. In babbitt reclaiming apparatus of the character described, a neutral atmosphere melting chamber and an oxidizing chamber communicating therewith and a flame-seal between the two chambers to prevent the oxidizing gases of the oxidizing chamber from entering the melting chamber, a first conveyer belt which carries babbitt-bearing steel scrap through the melting chamber where most of the babbitt is melted off the steel scrap and which carries the steel scrap through the flame-seal and deposits the same into the oxidizing chamber, a second conveyer belt which receives the steel scrap from the first conveyer belt and carries it through the oxidizing chamber where the remaining babbitt on the steel scrap is substantially completely oxidized, cam actuated belt-raising arms pivotally mounted below the upper stretch of said first conveyer belt to intermittently and alternately raise and drop said first conveyor belt, each said belt-raising arm being connected to a rocker, one end of each said rocker rotatably mounting a cam follower, a cam operatively associated with each said cam follower to oscillate the rocker and power transmission means operatively connecting said cams to a source of power.

4. Apparatus in accordance with claim 3 including a dash-pot for each rocker and a link to connect the end of the rocker opposite the cam follower to the dash-pot, the free ends of the belt-raising arms carrying a shaft which carries rollers which engage the underside of the upper stretch of the conveyor belt to lift it at spaced intervals during operation of the apparatus.

References Cited in the file of this patent

UNITED STATES PATENTS

| Number | Name | Date |
|---|---|---|
| 784,856 | Green | Mar. 14, 1905 |
| 1,141,769 | Carnahan et al. | June 1, 1915 |
| 1,808,721 | Hayes | June 2, 1931 |
| 1,826,755 | Eppensteiner et al. | Oct. 13, 1931 |
| 1,938,239 | White | Dec. 5, 1933 |
| 2,041,811 | Betterton et al. | May 26, 1936 |
| 2,146,760 | Pearson | Feb. 14, 1939 |
| 2,154,673 | Fleck et al. | Apr. 18, 1939 |
| 2,203,895 | Davis et al. | June 11, 1940 |
| 2,349,972 | Lister | May 30, 1944 |
| 2,403,419 | Wilkins et al. | July 2, 1946 |
| 2,468,660 | Gjedebo | Apr. 26, 1949 |
| 2,552,648 | Poland | May 15, 1951 |

FOREIGN PATENTS

| 19,754 of 1929 | Australia | Sept. 27, 1929 |